United States Patent
Lucidarme et al.

(10) Patent No.: US 6,704,546 B1
(45) Date of Patent: Mar. 9, 2004

(54) METHOD AND APPARATUS FOR ALLOCATION OF A TRANSMISSION FREQUENCY WITHIN A GIVEN FREQUENCY SPECTRUM

(75) Inventors: Thierry Lucidarme, Montigny le Bretonneux (FR); Paul Vincent, Rueil-Malmaison (FR)

(73) Assignee: Nortel Matra Cellular (FR)

( * ) Notice: Subject to any disclaimer, the term of this patent is extended or adjusted under 35 U.S.C. 154(b) by 0 days.

(21) Appl. No.: 09/286,955

(22) Filed: Apr. 6, 1999

(30) Foreign Application Priority Data

Apr. 10, 1998 (EP) .............................. 98400894

(51) Int. Cl.$^7$ ............................................. H04B 15/00
(52) U.S. Cl. ........................................ 455/62; 455/450
(58) Field of Search .................... 455/62, 450, 63, 455/67.1, 67.3, 71, 75, 454

(56) References Cited

U.S. PATENT DOCUMENTS

| | | | | | |
|---|---|---|---|---|---|
| 4,638,479 A | * | 1/1987 | Alexi | ........................... | 370/95 |
| 5,093,927 A | * | 3/1992 | Shanley | ........................ | 455/34 |
| 5,210,771 A | * | 5/1993 | Schaeffer et al. | .............. | 375/1 |
| 5,361,258 A | * | 11/1994 | Arnold et al. | ............. | 370/69.1 |
| 5,551,064 A | | 8/1996 | Nobbe | ........................ | 455/62 |
| 5,737,705 A | * | 4/1998 | Ruppel et al. | ............... | 455/452 |
| 5,752,164 A | * | 5/1998 | Jones | ......................... | 455/33.1 |
| 6,011,970 A | * | 1/2000 | McCarthy | .................... | 455/346 |
| 6,032,045 A | * | 2/2000 | Mimura | ....................... | 455/446 |
| 6,125,260 A | * | 9/2000 | Wiedeman et al. | ......... | 455/11.1 |
| 6,192,252 B1 | * | 2/2001 | Lysejko et al. | .............. | 455/512 |

FOREIGN PATENT DOCUMENTS

EP    0 641 093    3/1995

* cited by examiner

*Primary Examiner*—Lester G. Kincaid
*Assistant Examiner*—Naghmeh Mehrpour
(74) *Attorney, Agent, or Firm*—Barnes & Thornburg (57) ABSTRACT

A method/apparatus for use of the power/frequency characteristics of the candidate transmission for which the frequency must be allocated, the method/apparatus providing a power spectrum of the cumulative effect of the power/frequency characteristic of at least a portion of the existing transmission at a plurality of center frequencies within the frequency spectrum at the time of allocation, calculating allocation based on a first function of a combination of the power spectrum and the power/frequency of the candidate transmission, the first function being determined at different frequencies at the time of allocation, selecting a center frequency for the candidate transmission from the frequency spectrum based on a minimum value among the calculated allocation values or based on a calculated allocation value being below a first threshold value.

24 Claims, 7 Drawing Sheets

METHOD AND APPARATUS FOR ALLOCATION OF A TRANSMISSION FREQUENCY WITHIN A GIVEN FREQUENCY SPECTRUM

The present invention relates to a method and apparatus for allocation of a frequency band within a given frequency spectrum of a telecommunications system, as well as the telecommunications network itself. The present invention may also relate to a control element for transceiver such as a base station, a base station controller or a mobile station in a radio telecommunications system capable of carrying out the method in accordance with the present invention. The invention is particularly suited to a telecommunications system which includes at least one radio system, particularly a mobile radio system using spread spectrum techniques or a combination of spread and non-spread techniques.

TECHNICAL BACKGROUND

Figure 1:
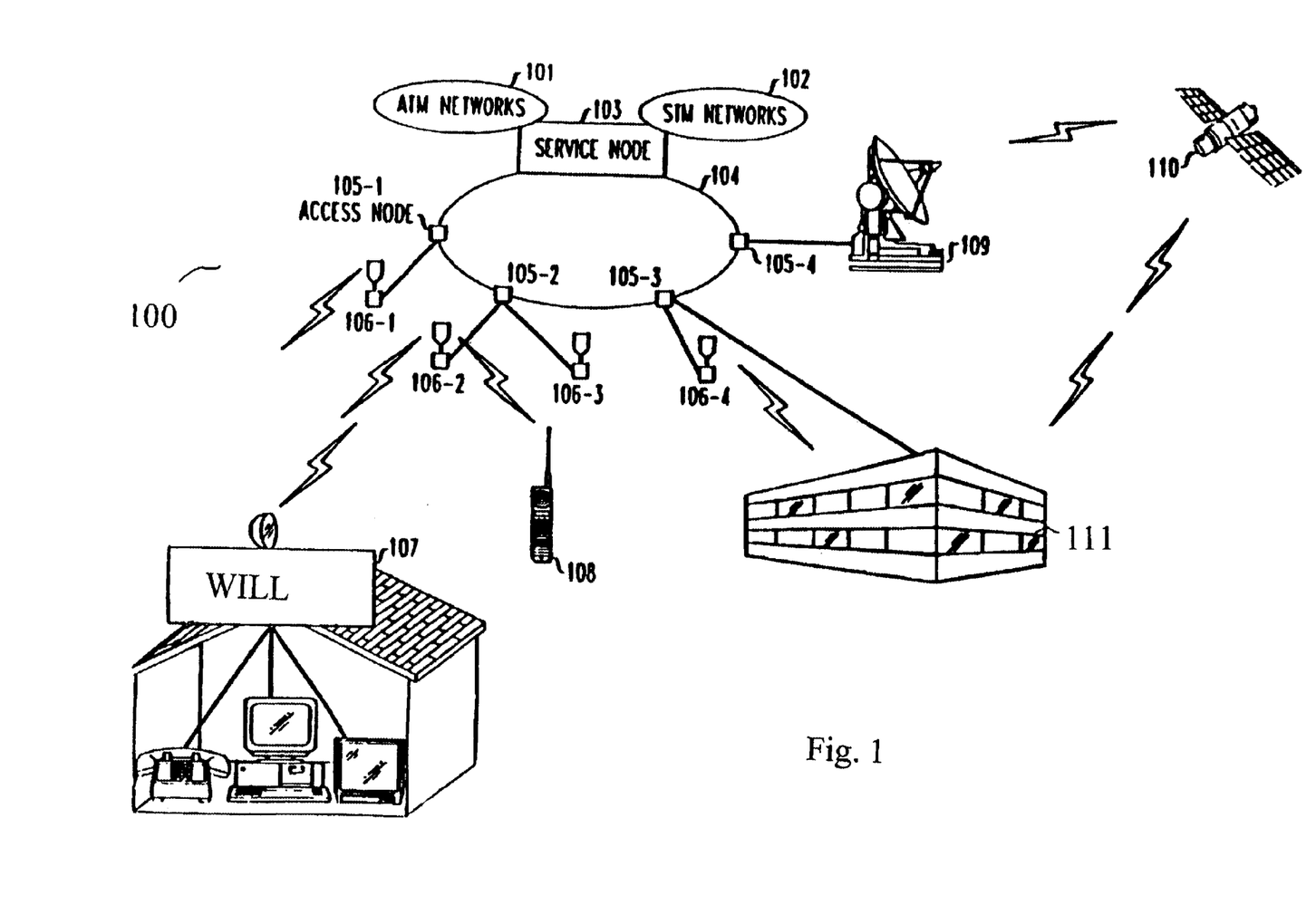
FIG. 1 is a schematic representation of a telecommunications system including radio components to which the present invention may be applied.

FIG. 1 is a schematic representation of a telecommunications system 100 which A includes a network 104 which may be a wireline telephone and/or data network. Network 104 may be connected via service node 103 to further networks 101 and 102 which may be synchronous (STM) or asynchronous (ATM), wireline or wireless networks. The network 104 may be connected to radio telecommunications transceivers 106-1, 106-2, 106-3, 106-4 via access nodes 105-1, 105-2, 105-3. The transceivers 106 may be part of the telecommunications network 104 or may be part of separate cellular mobile telephone or public radio system or systems. Further, the network 104 may be connected via a transceiver 109 to a satellite system including at least one satellite 110. The foot-print of the beam from the satellite 110 may overlap with the radio coverage of the transceivers 106. The network 104 may also be connected to a telecommunications system in building 111 which may form a micro- or pico-cellular radio telecommunications system within a macro-cellular telecommunications system served by one or more of the transceivers 106 and/or satellite 110. Alternatively, building 111 may contain a cordless telephone system connected to network 104 by a wireline. Mobile stations 108 may be able to receive and transmit messages via any of the transceivers 106 and 109 and satellite 110 including communication via the cordless or wireless network within building 111. In addition the building 107 which may be a private house may be connected to network 104 by a so-called wireless local loop (fixed wireless access), i.e. a part of the connection to building 111 is via a radio link.

In addition to the above telecommunications systems there may also be other sources of radio noise, e.g. point-to-point microwave communication systems, CB radio, military communications systems. The result is a considerable amount of radio activity within a certain, normally allocated or regulated frequency spectrum. Conventional approaches to preventing interference between the types of radio system mentioned above require the allocation of fixed frequency bands as exemplified by the conventional systems described in U.S. Pat. Nos. 5,452,471, 5,428,819 or EP 0 719 062 for instance.

Figure 2A:
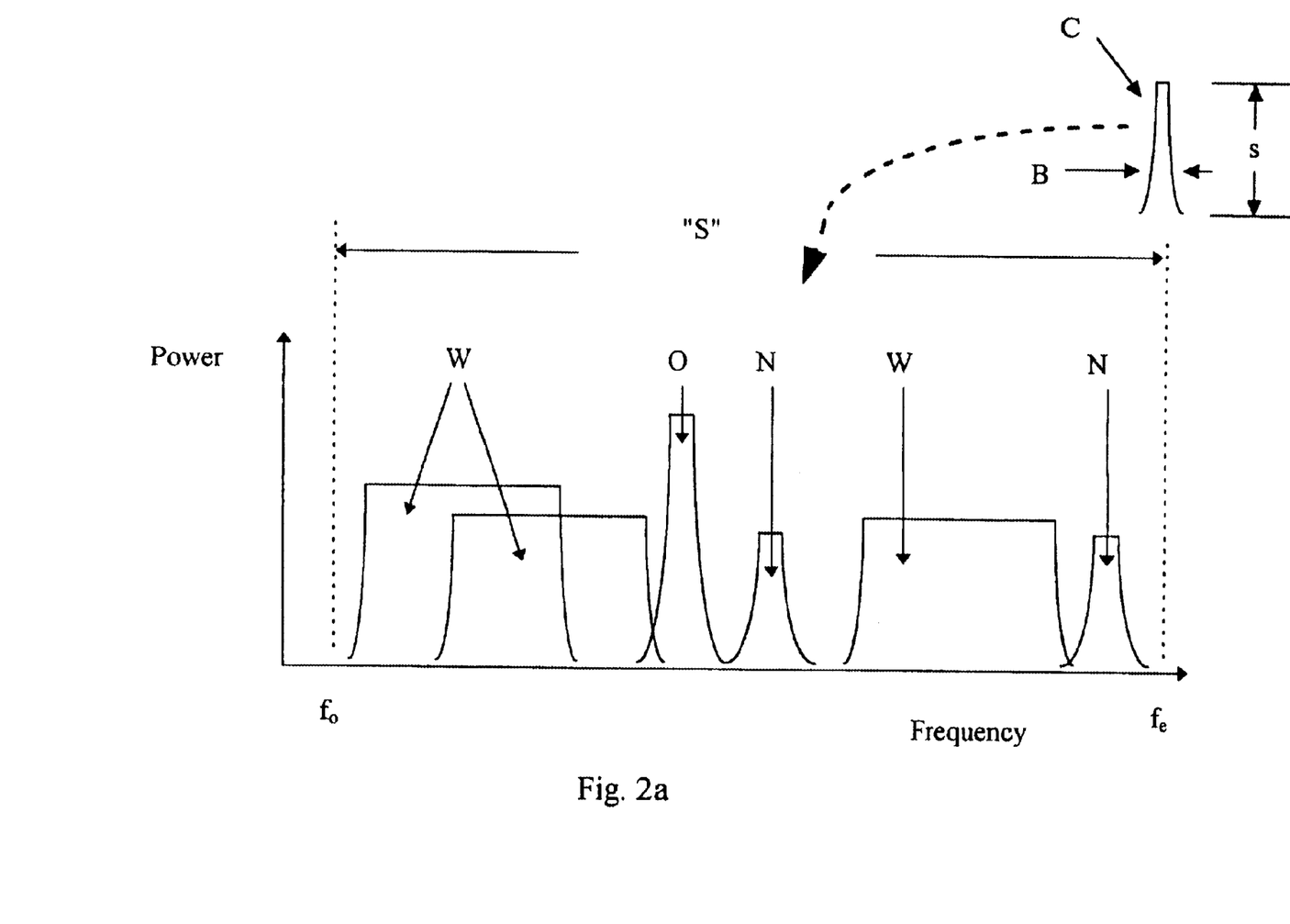
FIG. 2a is a schematic representation of transmissions within a frequency spectrum of a telecommunications system.

When all the telecommunications systems mentioned above are operating, there are a plurality of existing transmissions as indicated schematically in FIG. 2a. Within a frequency spectrum S between the lower and higher frequency limits $f_o$ and $f_e$ various radio telecommunications transmissions occupy part of the spectrum, e.g. wideband communications W, narrow band communications N, a point-to-point microwave communications transmission O. At any arbitrary location within the geographical coverage area served by all the systems at which a transmission is to be initiated these signals, each one of which is a function of power and frequency, combine as shown schematically in FIG. 2b. The resulting cumulative power/frequency diagram will be called a "power spectrum" in accordance with the present invention whereas "frequency spectrum" will be used to refer to the range of frequencies which can be used for communications within a telecommunications system.

Parts of the generalised communications systems of FIG. 1 may have fixed and protected frequency bands, e.g. the microwave system O, or emergency, hospital or police communications transmissions which may be wideband, broadband or narrowband. Narrowband in accordance with the present invention means a communication which requires relatively little bandwidth because the amount of information to be transmitted is small. Wideband in accordance with the present invention means a communication which has a significantly wider bandwidth than required for the information to be carried. Broadband in accordance with the present invention means a communication which requires a broad bandwidth due to the amount of information to be transmitted. In accordance with conventional methods, any new telecommunications system is allocated a fixed bandwidth in a remaining part of the frequency spectrum S in such a way as to avoid interference between the systems, i.e. usually by providing a frequency guard gap between the new system and any existing system. One disadvantage of such conventional allocation methods is that frequency spectrum may be left unused or may be inefficiently used, i.e. the spectral efficiency is low unless every system is used heavily.

So-called etiquette regulations are known for unlicensed bands of radio frequency for use by mobile radio, e.g. telephone or data services as described for instance in the article "Coexistence and Access Etiquette in the United States Unlicensed PCS Band", by Steer, IEEE Personal Communications Magazine, fourth quarter 1994. The main etiquette rules described in this article are:

1) the co-ordination rule—every communication between a fixed station (sometimes called a port) and a mobile station must start from a fixed station. A mobile station "listens" for a marker or beacon signal from a fixed station and requests access thereto before a communication may be initiated from a mobile station.
2) The listen before transmit (LBT) rule—before the fixed station transmits a marker or beacon signal it first measures the interference in the time/frequency window in which it intends to transmit.
3) The 30-second rule—a marker or beacon signal may only be transmitted for 30 seconds maximum without acknowledgement from another station wishing to transmit to it and periodic acknowledgements must be received every 30 seconds.
4) The packing rule—the LBT must be carried out so that frequencies are either scanned in increasing or decreasing order and the first acceptable frequency must be taken. Transmissions having a bandwidth below a first limit, e.g. below 625 kHz, scan from the lower frequency limit upwards and transmissions having a second bandwidth, e.g. above 625 kHz, scan from the upper frequency limit downwards. This rule packs the wider bandwidth communications in the upper part of the frequency spectrum and the narrower bandwidth communications in the lower part of the frequency spectrum.

5) The power level rule, the power level of a communication is limited by its bandwidth.

One application of such rules is described in the article "On channel definitions and rules for continuous dynamic channel selection in coexistence etiquettes for radio systems", by D. Akerberg, 44th IEEE Technology conference Stockholm, June 1994, pp. 809–13. In this scheme a system access channel is described as free, i.e. available for transmission, if the power at a particular frequency as determined during LBT is less than the thermal noise floor plus 24 dB. If no free channel is available then a least interfered channel (LIC) is selected if the result of the LBT is a frequency having a power level of less than the thermal noise floor plus 60 dB. It is stated that such an etiquette regulation is not suitable for use with frequency hopping code division multiple access (FH-CDMA) or Direct sequence code division multiple access schemes (DS-CDMA). One reason for this is that DS-CDMA suffers from the "near-far problem" and this is normally solved by power control particularly on handover. The power rules mentioned above are too crude to allow for such a power control.

Spread spectrum techniques are known to the skilled person and include fast :frequency hopping and direct sequence techniques. Spread spectrum communications may be defined as systems that possess the two characteristics: 1) the transmitted signal is spread over a frequency band wider than the minimum bandwidth required for the information to be sent, and 2) the spreading of the signal is achieved by encoding it with a pseudo-random code sequence, sometimes known as pseudo-noise (PN) which is independent of the information itself. In the receiver a despreading operation must be carried out to extract the original data signal.

Summaries of these techniques may be found in the articles: "Spread Spectrum Communication Techniques", by Tsui and Clarkson, Electronics & Communication Eng. Journal, vol. 6, number 1, February 1994, pp 3–12, and "Simplified matched filter receiver designs for spread spectrum communications applications", by Povey and Grant, Electronics & Communication Eng. Journal, vol. 5, number 2, April 1993, pp 59–64 and "Pseudo noise sequences for engineers", by Mutagi, Electronics & Communication Eng. Journal, vol. 8, number 2, April, 1996, pp 79–87. It is known to use such techniques with frequency division and also with combined frequency and time division multiple access.

An object of the present invention is to organise a plurality of telecommunication systems operating within a frequency spectrum, each free to place a communication within any non-excluded part of the spectrum, while reducing the conflict between the systems.

A further object is to provide coexistence of telecommunications systems in which at least one system uses spread spectrum techniques such as DS-CDMA.

A further object of the present invention is to provide a method of placing a next communication with a bandwidth "B" and power level "s" at an appropriate place within a spectrum S in a radio telecommunications system so as not to cause serious interference to other users as well as not to be significantly interfered with by other users without having to rely on techniques which allocate specific frequency bands to specific communications.

SUMMARY OF THE INVENTION

The present invention includes a method of allocating a transmission centre frequency for a candidate transmission within a given frequency spectrum available for communications within a telecommunications system, the candidate transmission having a power/frequency characteristic representative of the power of the candidate transmission as a function of frequency, comprising the steps of providing a power spectrum representative of the cumulative effect of the power/frequency characteristics of at least a portion of the existing transmissions at a plurality of centre frequencies within the frequency spectrum at the time of allocation; evaluating allocation decision values defined by a first function of the power spectrum and the power/frequency characteristic of the candidate transmission; and selecting a centre frequency for the candidate transmission from the frequency spectrum based on a minimum value among the evaluated allocation decision values or based on an evaluated allocation decision value being below a first threshold value.

The present invention also includes a telecommunications system operating within a frequency spectrum available for communications, comprising: means for allocating a centre frequency for a candidate transmission, the candidate transmission having a power/frequency characteristic representative of the power of the candidate transmission as a function of frequency; means for providing a power spectrum representative of the cumulative effect of the power/frequency characteristics of at least a portion of the existing transmissions at a plurality of centre frequencies at the time of allocation; and the allocating means including: means for evaluating allocation decision values defined by a first function of the power spectrum and the power/frequency characteristic of the candidate transmission; and means for selecting a centre frequency for the candidate transmission from the frequency spectrum based on a minimum value among the evaluated allocation decision values or based on an evaluated allocation decision value being below a first threshold value.

The present invention also includes a frequency allocating device for use in a telecommunications system operating within a frequency spectrum, the frequency allocating device comprising: means for allocating a centre frequency for a candidate transmission, the candidate transmission having a power/frequency characteristic representative of the power of the candidate transmission as a function of frequency; means for providing a power spectrum representative of the cumulative effect of the power/frequency characteristics of at least a portion of the existing transmissions within the frequency spectrum at a plurality of centre frequencies at the time of allocation; and the allocating means including: means for evaluating allocation decision values defined by a first function of the power spectrum and the power/frequency characteristic of the candidate transmission; and means for selecting a centre frequency for the candidate transmission from the frequency spectrum based on a minimum value among the evaluated allocation decision values or based on an evaluated allocation decision value being below a first threshold value.

The present invention also includes a method of operating a frequency allocation device for allocating a transmission centre frequency for a candidate transmission within a given frequency spectrum available for communications within a telecommunications system, the candidate transmission having a power/frequency characteristic representative of the power of the candidate transmission as a function of frequency; comprising the steps of providing a power spectrum representative of the cumulative effect of the power/frequency characteristics of at least a portion of the existing transmissions at a plurality of centre frequencies within the frequency spectrum at the time of allocation; evaluating allocation decision values defined by a first function of the power spectrum and the power/frequency characteristic of the candidate transmission; and selecting a centre frequency for the candidate transmission from the frequency spectrum based on a minimum value among the evaluated allocation decision values or based on an evaluated allocation decision value being below a first threshold value.

Figure 2B:
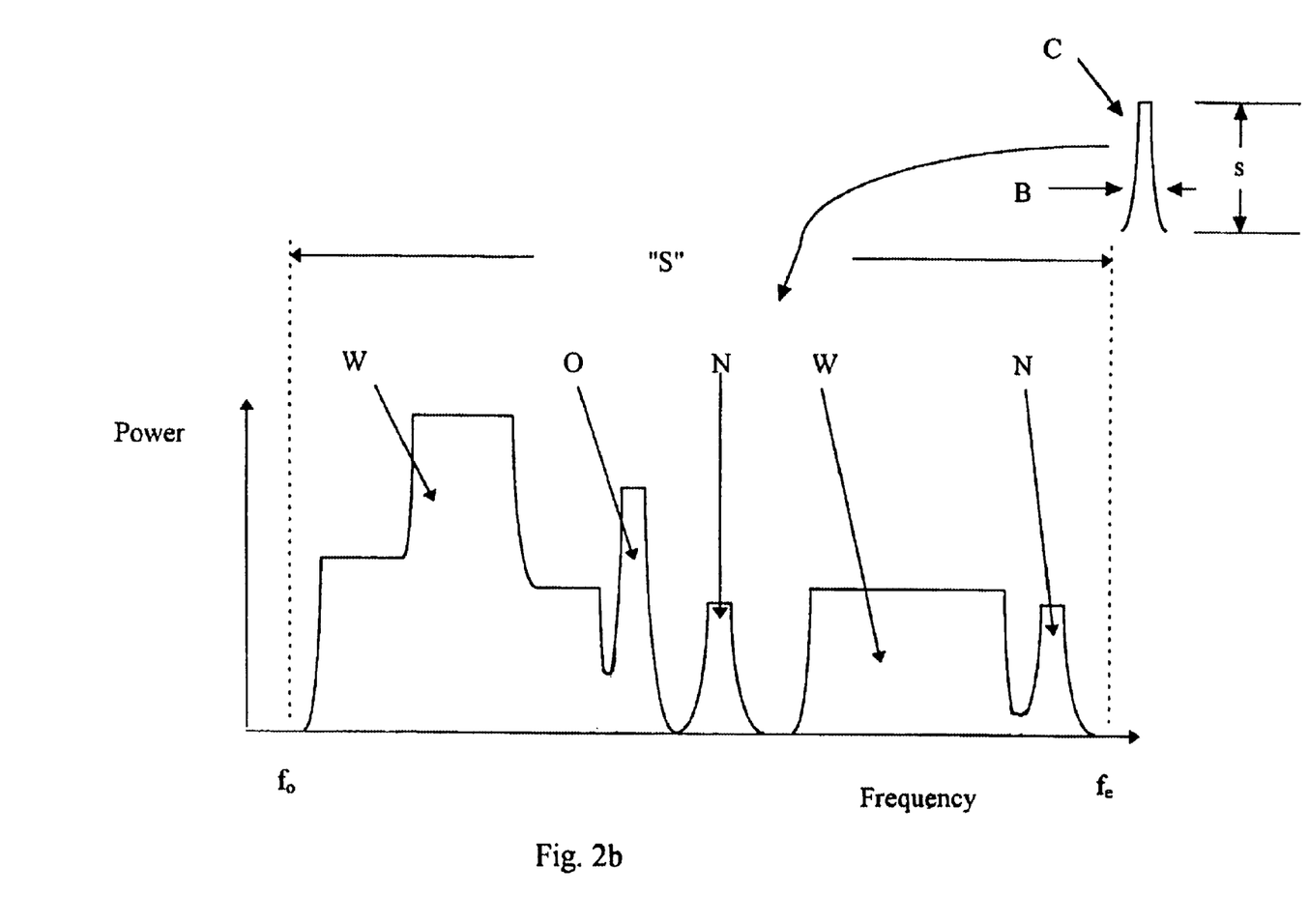
FIG. 2b is a schematic representation of a power spectrum based on FIG. 2a in which a candidate transmission "C" has to be allocated a centre frequency.

In accordance with the present invention spectral efficiency may be improved by allocating bandwidth on a communication-by-communication basis within any regions of the spectrum S of FIG. 2 which are not specifically excluded or protected. For ease of calculation it is preferred if the power/frequency characteristic of the candidate transmission or the existing transmissions is a representative power level value and bandwidth value. The first function is preferably indicative of the interference of the existing transmissions on the candidate transmision, e.g. a multiplication or an integral function. Preferably, the selection of a suitable centre frequency is only carried out if the value of a second function of the power spectrum and the power/frequency characteristic of the candidate transmission is below a predetermined value. The second function is preferably indicative of interference of the candidate transmission on the existing transmissions, e.g. a multiplication function.

The dependent claims define further individual embodiments of the present invention. The present invention will be described with reference to the following drawings.

DESCRIPTION OF THE ILLUSTRATIVE EMBODIMENTS

The present invention will be described with reference to certain embodiments and drawings but the invention is not limited thereto but only by the claims. Further, the present invention will mainly be described with reference to a cellular mobile telephone system but the invention is not limited thereto and includes within its scope any telecommunications system in which a frequency band must be selected from within an occupied frequency spectrum.

The present invention relates to a method and apparatus for allocation of a frequency band within a given frequency spectrum for each communication of a telecommunication system as well as to the telecommunication system itself and a method of operating the same. In accordance with the present invention spectral efficiency may be improved by allocating bandwidth on a communication-by-communication basis within any regions of the spectrum S of FIG. 2 which are not specifically excluded or protected. Embodiments of the present invention will be described with reference to FIGS. 2 to 8.

The telecommunications system in accordance with the present invention may provide one or more of the following:
a) Digital or analogue radio transmissions for telephones or data devices.
b) Reliable and effective coexistence of substantially uncoordinated or coordinated radio telecommunications systems while avoiding or enhancing conventional frequency planning or ownership of access channels.
c) Shall allow use of existing systems while allowing evolution of new digital radio technologies.

The frequency allocation in accordance with the present invention may be performed by a frequency allocation manager (FAM). A FAM may be located centrally within the network or several FAM's may be distributed, i.e. individual elements of the telecommunications system such as a base station or a mobile station may contain a FAM and the decision on allocation of the frequency for a communication may be decided locally. Hence, the location of the FAM may be anywhere in the hierarchy of the telecommunications network, e.g. in an individual mobile station, in an individual base station, in a control element of a group of base stations, in a control element for a whole network or in a control element for a group of networks. In addition, the present invention includes a hierarchy of FAM's, i.e. there may be local FAM with a certain capability of allocating frequency, e.g. within a limited frequency spectrum, and there may be higher level FAM's which can decide over communication frequencies from a wider frequency spectrum or from different systems.

Figure 3:
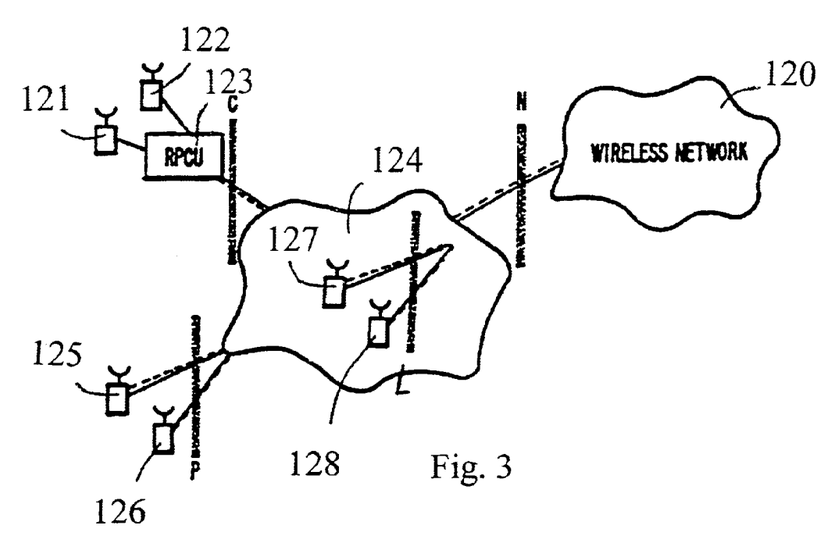
FIG. 3 is a schematic representation of a telecommunications network to which the present invention may be applied showing different access possibilities.

FIG. 3 is a schematic representation of part of a telecommunications network such as shown in FIG. 1. FIG. 3 shows an independent wireless network 120, e.g. a cellular telephone network, connected through another network 124 to other dependent or independent mobile telephone networks 121–123; 125,126 as well as to other telephone or data networks such as a public telephone system (PSTN, not shown). Access to network 124 via interfaces L, N, C and P provides different services to the networks 120–126. Network 124 may also have its own base station transceivers 127, 128 for providing mobile telephone services to subscribers. Hence, the L interface is within the network 124 and the base station transceivers 127, 128 are completely controlled thereby. The N interface is between an independent wireless network 120 and the network 124 whereby the network 120 has capabilities to provide call control processing, radio management and subscriber information storage. The network 124 provides at least call routing functions so that calls to and from network 120 may be delivered to the called party including delivery to other data or telephone networks (not shown).

The C interface serves a mobile telephone system 121–123 including at least base station transceivers 121 and 122 and a base station controller 123. The base station controller may provide channel control and possibly some local data storage, e.g. a so-called visiting location registry (VLR) to store subscriber information of mobile stations visiting the radio coverage area of transceivers 121, 122. Network 124 may provide data storage, e.g. subscriber and network control information, as well as control elements for both networks. The P interface provides services to a mobile telephone system 125, 126 with a minimum of network functionality. The mobile telephone operator provides only the radio coverage areas of base station transceivers 125 and 126, all other network function are carried out by the network 124.

Figure 4:
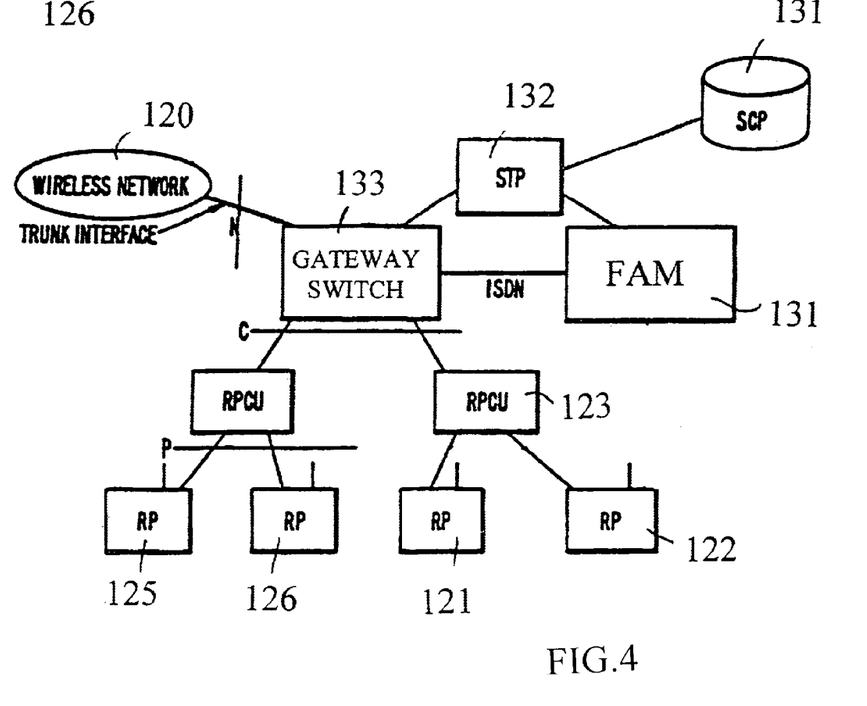
FIG. 4 is a schematic representation of an implementation of the network of FIG. 3.

FIG. 4 is a schematic representation of one embodiment of the present invention. Wireless network 120 of FIG. 3 is connected to the network 124 via a gateway switch 128. The interfaces N, P and C of FIG. 3 are indicated in FIG. 4. All connections within and to/from the network 124 may include not only channels or lines for transmitting user messages or "traffic" but also channels or lines for transmitting signalling messages, e.g. in an SS7 signalling protocol. Network 124 may be configured as an Intelligent Network (IN) or an Advanced Intelligent Network (AIN) including for instance a Signal Transfer Point (STP, 132) and a Signal Control Point (SCP, 131). In accordance with the present invention a FAM (Frequency Allocation Manager) 130 may be located centrally within the network 124 and in communication with the gateway switch 133, the STP 132 and other network elements. FAM 130 contains memory and a processor capable of storing and processing the power spectrum shown in FIG. 2b. Further, FAM 130 is preferably capable of dynamically updating the power spectrum of the type shown in FIG. 2b by receiving information from one or more of the networks 120, 121–123, 124, 125–126, or base stations 127–128 with respect to every currently active radio communication alternatively and/or additionally, which parts of the spectrum S have been allocated and may not be accessed by other systems. Based on this information FAM 130 allocates a frequency for any and each request for a communication channel received from any of the networks as will be described in more detail later.

Figure 5:
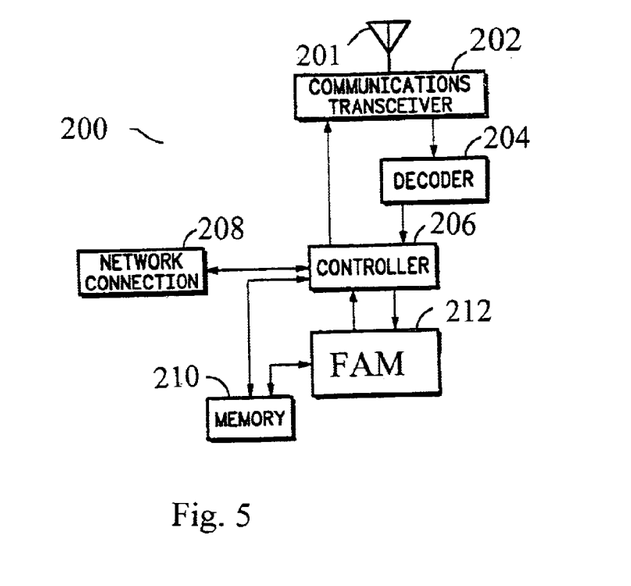
FIG. 5 is a transceiver according to one embodiment of the present invention.

A further embodiment of the present invention will be described with reference to FIG. 5. In accordance with this embodiment a FAM 212 may be located in any base station 200 such as any of 121–123; 125, 126; 127, 128 of FIGS. 3 and 4, i.e. the control of the allocations of frequency bands for communications is distributed throughout the system. Typically, a base station 200 may include an antenna 201 connected to a communications transceiver 202. Transceiver 202 is controlled by a controller 206, 204 for coding and decoding signals to and from the air interface which are transmitted to, or received from the network 124 via the network connection 208. A FAM 212 provides bandwidth information to controller 206 on request for a radio communication from controller 206. FAM 212 preferably includes a processor and may have its own memory or may share part of memory 210 with controller 206. FAM 212, similar to that already described with respect to FAM 130 of FIG. 4, stores and processes the power spectrum of the type shown in FIG. 2 as will be described later in more detail and may receive information from other parts of the network or other networks to update the power spectrum dynamically, e.g. on a communication-by-communication basis.

Figure 6:
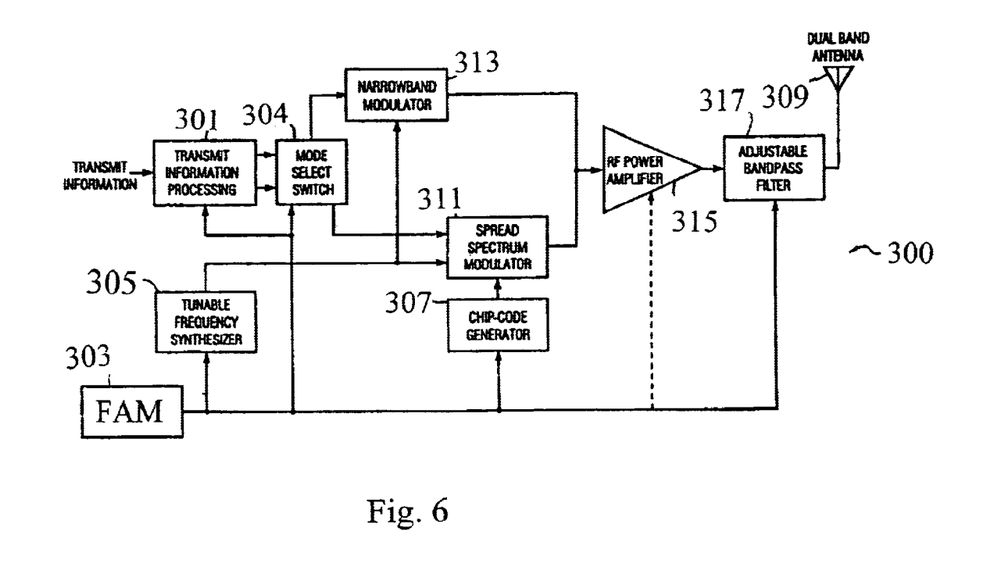
FIG. 6 is a transceiver according to another embodiment of the present invention.

A further embodiment of the present invention will be described with respect to the transceiver 300 of FIG. 6. Transceiver 300 may be a wideband or narrowband transceiver and may be used in any of the base stations such as the base stations 106 or earth station 109 or mobile stations 108 of FIG. 1 or base stations 121, 122, 125—8 of FIG. 3. In accordance with the present invention, transceiver 300 may also be a dual mode transceiver of which one example is described in WO 96/06490 without the specific novel features of the present invention. Dual mode transceiver 300 may transmit and receive communications via antenna 309 in two different operating modes, e.g. a spread spectrum (SS) mode and a narrowband mode. Which mode is used for transmission or reception is determined by switch 304. The narrowband mode is preferably a time division mulitiplex access (TDMA) mode in which the information to be transmitted or received is mixed with an intermediate frequency from oscillator 305 and modulated or demodulated, respectively by a modulator 313. The SS mode is preferably a Code Division Multiple Access (CDMA) mode in which individual communications are maintained orthogonal with respect to other communications on the same frequency by coding the transmission with a direct sequence pseudo-random (PN) code produced by a chip-code generator 307 which is supplied to a spread spectrum modulator 311 along with an IF signal from oscillator 305. In addition to the allocation of the frequency for each communication, FAM 303 carries out the control of the mode selection as well as adjusting the bandpass filter 317 to the required mode. With this embodiment FAM 303 has the additional capability of not only selecting which frequency to use for a communication but also to select between two different bandwidths. The particular advantage of CDMA is that it allows overlap of the frequency band of one communication with the frequency bands of other communications with only a slight increase in background white noise as perceived by the other communications while improving the noise/signal ratio of the received communication. In accordance with the present invention, FAM 303 may first attempt to place a narrowband communication within spectrum S and, if this fails, to attempt a wideband SS communication in the same power spectrum using different algorithms (if required) for the placement of the new frequencies in the two wide or narrowband cases.

When a request for a communication is received by transceiver 300, the FAM 303 a selects a mode for the communication based on available data, e.g. the FAM 303 may monitor or receive information about signal quality on signalling channels to determine the current value of the appropriate signal characteristic, e.g. signal/noise ratios or signal quality. Based on this initial information, FAM 303 investigates the power spectrum of existing communications as shown schematically in FIG. 2 and selects a centre frequency in the spectrum for the new transmission based on an algorithm which will be described later. If a suitable location cannot be found, the FAM 303 may select the other mode. Once a suitable centre frequency has been obtained the communication is initiated at this frequency, bandwidth and power. If during the transmission signal quality reduces, the FAM 303 may first adjust the power keeping the same centre frequency. If the received signal quality still does not improve sufficiently, the FAM 303 may trigger a new allocation of mode and frequency within the current power spectrum. If the signal quality still does not improve the FAM 303 may initiate handover to another transceiver at which the signal quality is better. The present invention also includes the use of a FAM with dual mode transceivers of the type described in WO 97/30523 which are capable for selecting different modes for transmissions in different frequency bands and modulations.

Figure 7:
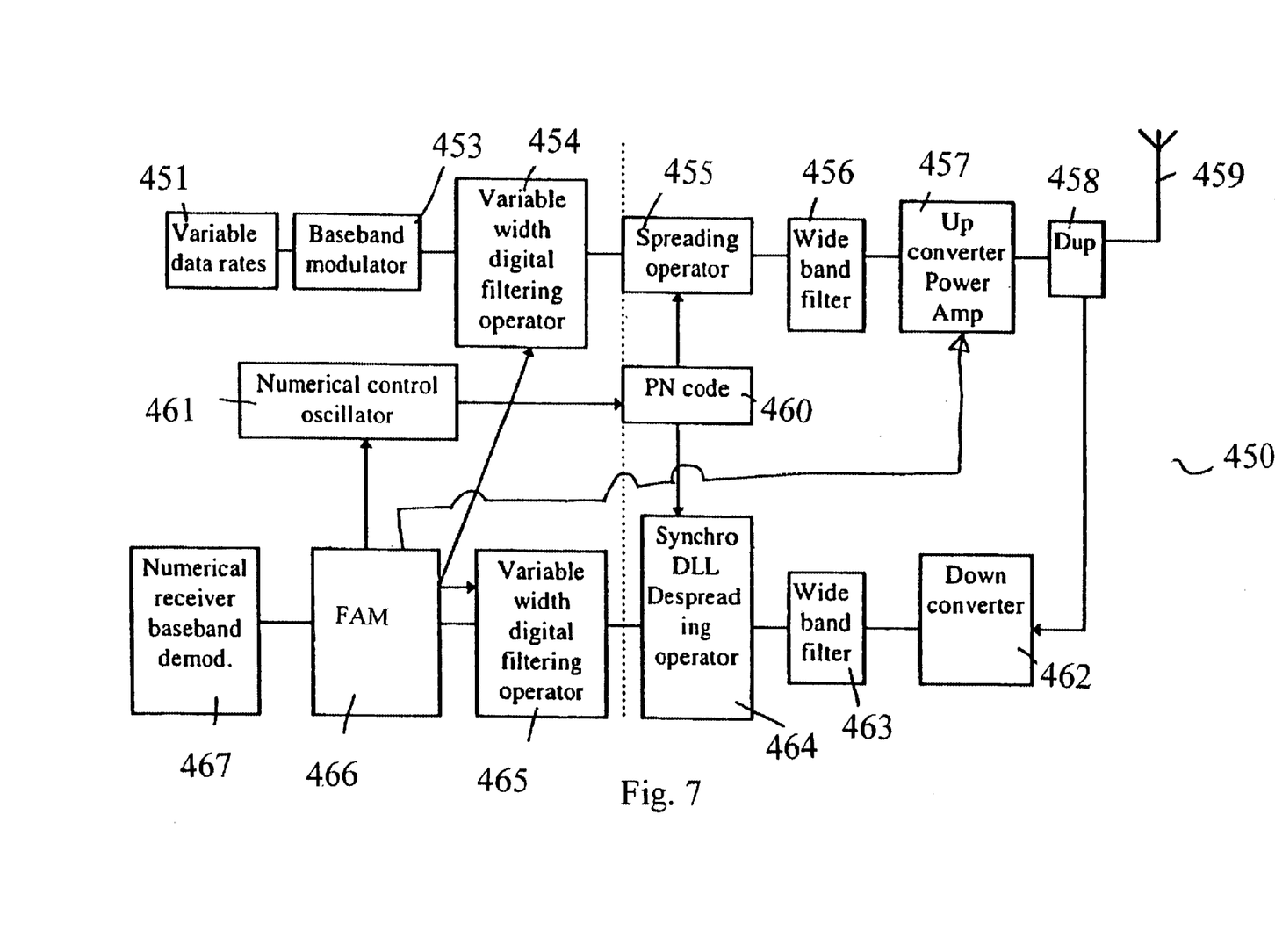
FIG. 7 is a transceiver according to another embodiment of the present invention.

A further embodiment of the present invention will be described with reference to FIG. 7 which is an extension of the dual mode transceiver 300 of FIG. 6 to a bandwidth agile transceiver 400 as generally described in co-pending European patent application EP 97403174.2 but without the specific novel features of the present invention. At the heart of the device 450 is the FAM 466 which acts as a frequency allocation, power and bandwidth determination circuit. FAM 466 not only allocates a suitable frequency for new transmission as described above for FAM's 130, 212, 303 but also may determine an optimum combination of bandwidth and transmission power for each transmission, either before the start, at the start of the transmission or continuously throughout the transmission. To achieve this optimisation, the FAM 466 requires an input of at least one relevant signal characteristic, e.g. signal quality and/or power, as well as a means for optimising the power/bandwidth, e.g. an algorithm, and a means to control and set the bandwidth and power independently. Optionally the distance from the transmitter to the receiver may also be input. In FIG. 7, the FAM 466 controls the setting of the transmitted power level by operating directly on attenuators in the up-converter power amplifier 458. Omitted from FIG. 7 are details of coding and interleaving of the digital signals as well as frequency hopping as applied to the carrier wave which are all known to the skilled person, e.g. from generic cellular telephone systems such as the GSM system. Detailed descriptions of this system may be found in the book "The GSM system for mobile communications", by Michel Mouly and Marie-Bernadette Pautet, Cell & Sys, 1992 as well as in the relevant GSM ETSI standards themselves.

The transceiver 450 may receive data 451 at varying rates, e.g. voice, packets of data, video. The data is modulated by the baseband modulator 453 with the modulation scheme appropriate to that data. The signal from the modulator 454 at the intermediate frequency is passed to a variable width digital filter 454 whose width is defined to be appropriate to the bandwidth of the signal from the modulator 454. The filter bandwidth is set by the FAM 466. From the filter 454, the modulated signal at the intermediate frequency is supplied to a spreading operator 455 which may be a multiplier. In the spreading operator 455 the modulated signal is modulated with a PN code from a PN code generator 460. The chip rate of the PN code is determined by the clock rate of a numerically controlled oscillator 461. The value of the clock rate is determined and set by the FAM 466. The spread signal from the operator 455 is supplied to a wide-band filter 456 for limiting unwanted side lobe frequencies produced by the spreading code. From the wideband filter 456 the spread and filtered signal is supplied to an up converter power amplifier 457 in which a carrier wave is modulated by the spread and filtered signal and supplied to an antenna 459 via, for example a duplexer 458.

When the transceiver 450 operates as a receiver for receiving a communication from a remote transceiver, the reverse of the above operations is carried out. A received signal from antenna 459 is supplied via a duplexer 458 to a down converter 462 in which the intermediate frequency signal is extracted from the RF carrier wave.

The extracted signal may be supplied to a wideband filter 463 to limit the received frequencies to the relevant range. From the wideband filter 463, the signal is passed to a despreading operator. In order to carry out the despreading, it is necessary for this circuit to receive the timing of the signal. This may be done by a delayed locked loop (DLL) as is known to the skilled person. In a DLL two signals are generated from the input signal, one delayed and one advanced, two envelope detectors are used to extract the envelopes of the two signals thereby removing the data. The average voltages are subtracted and supplied to the control input of a variable oscillator, the output of the VCO being supplied to the PN generator 460.

In the despreading operator 464 the intermediate frequency signal is multiplied by the PN code form the PN code generator 460 to extract the modulated data signal. The chip-rate of the PN code is determined by oscillator 461 controlled by FAM 466. The modulated data signal may be passed to a variable width digital filter 465 for final frequency band limitations before the received signal is analysed for signal quality and/or strength by the FAM 466. The bandwidth of the filter 465 is set by the FAM 466. The signal from the filter 465 is passed to the FAM 466 in which the relevant signal control characteristic, e.g. signal quality and/or signal strength, is determined for use in setting the bandwidth of the transmission. If it is determined that the signal quality is too low, the FAM 466 recalculates an optimum bandwidth and/or transmission power and/or centre frequency and sends the appropriate commands to the relevant circuits for controlling bandwidth and/or power level and/or frequency of transmissions including sending information to the remote transceiver so that it itself may adapt to the new transmission parameters. Finally, the signal is demodulated in a baseband demodulator 467 with the appropriate modulation scheme to extract the data signal.

As will be understood by the skilled person from the above description, FAM 466 is able not only to set the centre frequency, bandwidth and power of a communication to provide reduce interference but is also able to adjust parameters of communications both statically and dynamically. When a request for a communication is received by transceiver 400, the FAM 466 determines a suitable bandwidth and power for the communication based on available data, e.g. the FAM 466 may monitor signalling channels to determine the current value of the appropriate signal characteristic, e.g. signal/noise ratios or signal quality. Based on this initial information, FAM 466 investigates the power spectrum of its environment and selects a centre frequency for the transmission in the spectrum based on an algorithm which will be described later. If a suitable location cannot be found, the FAM 466 adjusts the bandwidth and power, e.g. makes the bandwidth wider and attempts again to find a suitable location within the power spectrum. Alternatively, the FAM 466 may try a narrower bandwidth Once a suitable centre frequency has been obtained the communication is initiated at this frequency, bandwidth and power. If during the transmission signal quality reduces, the FAM 466 may first adjust the power and bandwidth keeping the same centre frequency. If the received signal quality still does not improve sufficiently, the FAM 466 may trigger a new allocation of frequency, bandwidth and power within the current power spectrum. If the signal quality still does not improve the FAM 466 may initiate handover to another base station where signal quality is better.

Various embodiments of a FAM in accordance with the present invention have been described above. All of these embodiments have in common that they select a centre frequency within the power spectrum of FIG. 2 for a communication having a bandwidth B and a power s in order to optimise and/or reduce interference both to and from other transmissions. Once the present invention has been understood, the skilled person will appreciate that there may be several methods which can be applied to achieve this result and only a few examples is given below for explanation purposes.

Let the power/frequency power spectrum of FIG. 2b for a total of n−1 currently active communications be represented by the function $P_{n-1}(f)$ where f represents the frequency. Protected frequency bands may be assigned an exaggeratedly high power level in order to prevent selection in these zones. Further, let the power of the new candidate communication (the $n^{th}$) be represented by the function B(f)

as a function of frequency f. In accordance with the present invention the function B(f) may be used for determining the centre frequency for candidate transmission, however, to reduce the calculation load it is preferred if a simpler characteristic of the function B(f) is used. It is assumed in the following that B(f) for any existing or candidate transmission can be adequately described by a power level and a bandwidth. For instance, a maximum power "s" or an RMS value of the power may be used to represent the power of the candidate transmission. The frequency dependence may be represented by a bandwidth of $2\Delta b$ about a centre frequency (yet to be decided). The bandwidth may be taken as the frequency difference between the first zeros on either side of the primary lobe.

Alternatively, the frequency difference between the two furthest points which have a certain power level, e.g. 26 dB, below the peak emission may be taken as the bandwidth. Which method is used to determine s and $2\Delta b$ may have detailed effects on certain limiting values in accordance with the present invention such as $V_{max}$ or $P^{max}$ but do not effect the principles of the invention.

It is required in accordance with the present invention to find a centre frequency within the spectrum S for the candidate transmission B(f) which minimises or optimises a function which is representative of the likely interference. As interference depends upon the power level of the new and the existing transmissions, this determination may also mean that a function of the power in the power spectrum or of a combination of the power in the power spectrum and of the candidate transmission is minimised or optimised.

Firstly, the situation will be described when a FAM in accordance with the present invention has to place a spread spectrum signal. The requirements for the transmitted signal having a power $P_1$, bandwidth $B_1$, and a bit rate b (i.e. a spreading ratio of $B_i/b$) when the frequency spectrum as in FIG. 2b includes an existing, potentially jamming transmission with a power $P_2$ and a bandwidth $B_2$ may be summarised as follows:

$$C/I \geq P_1/P_2 \times B_1/b \times B_1/B_2 \qquad \text{Eq. 1a}$$

or if the power levels and C/I are expressed in dB:

$$C/I \geq P_1 - P_2 + 10 \log_{10} B_1/b + 10 \log_{10} B_1/B_2 \qquad \text{Eq. 1b}$$

where C/I is the acceptable ratio of carrier power to interference or janmning power. The third term in the latter equation will be called the "despreading gain" and the fourth term the "bandwidth gain".

In accordance with one embodiment of the present invention the integral of the function B(f) multiplied by the power spectrum $P_{n-1}(f)$ is calculated over the bandwidth of B(f) for each of a plurality "m" of different candidate centre frequencies spaced uniformly throughout the spectrum S. The centre frequency is then determined at which the value of this integral is a minimum. If the spacing of the m centre frequencies is $\Delta f$, i.e. $m \times \Delta f = f_e - f_o$, then let a power function $P_i^{n-1}(f)$ be the multiplication of the function $P_{n-1}(f)$ and B(f) divided by s when B(f) is located at the centre frequency of the new communication which equals $f_o + i \times \Delta f$. In other words:

$$P_i^{n-1}(f) = P_{n-1}(f) \times B_i(f)/s \qquad \text{Eq. 2}$$

where B(f) is the function B(f) when located at the centre frequency $f_o + i \times \Delta f$. Next a value is obtained which is representative of $P_i^{n-1}(f)$ over the width $2\Delta b$. There are several methods which may be used to obtain a value representative of this function over the width $2\Delta b$ of B(f). For instance an average may be taken. Alternatively, a value $V_i$ of a decision criterion for $B_i(f)$ may be given by:

$$V_i = \int_{-\Delta b}^{+\Delta b} P_i^{n-1}(f) df. \qquad \text{Eq. 3}$$

The value of $V_i$ is then calculated for each value of i between 1 and m by one of the methods mentioned above, preferably Eq. 3, and the minimum value selected. This may be done by starting with the centre frequency of B(f) at $f_o$ and calculating $V_0$ and then increasing the centre frequency in increments of $\Delta f$. If the new value of V is smaller than the previous value the new values of V and i are stored. If the new value of V equals the old or is within a pre-defined small amount of the old value, then both may also be stored and a selection made later. If V exceeds the old value by a small predetermined amount it is ignored and the next vale of i is used to calculate a new V. Once all the m values of centre frequency have been used in the determination of V, the final value of V may be selected which is one minimum of the stored values. From the value of i associated with this minimum V, the corresponding centre frequency $f_i$ can be determined ($f_0 + i\Delta f$) and the communication initiated at this frequency. Of course, the calculation procedure mentioned above could start at $f_e$ and work downwards.

If several minimums of the decision criterion V are determined by the above method, there may be ambiguity as to how to select the best centre frequency. One method is to consider the situation which optimises the $n+1^{th}$ communication. For example, let m=10 and let minimums be found at i=2, 5, 6 and 7. A major concern may be finding a centre frequency for a broadband communication, e.g. video. Then it would be preferably to place the $n^{th}$ communication at the frequency defined by i=2 leaving contiguous low interference bands 5–7 in case a broadband communication is required next.

Alternatively, a value of V may be considered acceptable for a candidate communication if it is simply below a certain threshold value $V_{max}$ even if it is not a minimum of all the V values. The present invention also includes a further embodiment in which no candidate communication is initiated if the minimum value of V determined by the above procedure is above a maximum threshold value $V_{max}$. $V_{max}$ should be chosen so as to guarantee the requirements of Eq. 1a and b. If no value of V is found below $V_{max}$, another attempt may be made later, a different frequency spectrum may be selected, e.g. from GSM to DCS, a different power/bandwidth combination for the candidate transmission may be used if the transceivers accept such multi-mode operation or a handover may be attempted to another cell which may have improved reception and/or communication conditions. The present invention also includes having different maximum threshold values $V_{max}$ depending upon the bandwidth or type of communication which the FAM is trying to allocate. For instance, the threshold $V_{max}$ may decrease with reducing bandwidth, e.g. the maximum threshold value $V_{max}$ may be proportional to the product of the power of the new transmission and the square root of its bandwidth although the present invention is not limited thereto. Where the FAM has the possibility of allocating a narrowband or a wideband communication, two different maximum threshold values $V_{max}$ may be used as selection criteria, whereby the maximum value $V_{max}$ for the wideband communication may be higher than for the narrowband communication.

Eq. 3 above allows for interference advantage provided by the bandwidth gain of a spread spectrum signal but not for the despreading gain. As long as only one PN code rate is used for the spread spectrum signal this may have no deleterious effect. However, the transceiver 450 of FIG. 7 is capable of transmitting with various PN code rates. In a further embodiment of the present invention the maximum threshold value $V_{max}$ may be modified by the despreading gain of the candidate communication. For instance, it is preferred if the acceptable maximum level $V_{max}$ of V used as the decision criterion is increased by the ratio $B_1/b$ of the candidate transmission. Alternatively and less preferred, if a FAM in accordance with the present invention is trying to place a candidate spread spectrum transmission with a despreading gain of $B_1/b$, the relevant value of the decision characteristic V may be based on:

$$P_i^{n-1}(f)=P_{n-1}(f)\times B_i(f)\times b/B_1 \times s \qquad \text{Eq. 4}$$

which is then substituted in Eq. 3. In accordance with another preferred embodiment of the present invention in order to determine $V_i$, Eq. 3 may be modified as follows:

$$V_i = b/B_1 \times \int_{-\Delta b}^{+\Delta b} P_i^{n-1}(f) df. \qquad \text{Eq. 5}$$

In the above embodiments the result is always to lower the requirement for placing a transmission by the ratio $B_1/b$.

It is preferred in accordance with another embodiment of the present invention if the candidate spread spectrum transmission does nor seriously interfere with existing transmissions. The result of Eq. 2, $P_i^{n-1}(f)$, is the multiplication of the power spectrum of existing transmissions with the candidate transmission signal when this signal has a centre frequency of $f_o+i\times\Delta f$. The maximum value $P_{imax}^{n-1}(f)$ of the function $P_i^{n-1}(f)$, therefore provides a measure of the jamming capability of the candidate transmission with respect to the existing transmissions when the centre frequency of the candidate transmission is $f_o+i\times\Delta f$ under the assumption that the existing transmissions are not spread which may be considered as a worst case scenario. Thus, to decide on the frequency allocation of a spread spectrum candidate transmission, the maximum value of $P_{imax}^{n-1}(f)$ of each multiplication $P_i^{n-1}(f)$ may be compared with a maximum allowable value $P^{max}$. $P^{max}$ should be chosen so that the requirements of C/I for the transmissions is guaranteed. If the value of $P_{imax}^{n-1}(f)$ is lower than $P^{max}$ the candidate transmission is unlikely to interfere with the existing transmissions. The selection method in accordance with this embodiment includes the following steps.

1) For the candidate spread spectrum transmission determine for each value of i the result of multiplication $P_i^{n-1}(f)$.
2) At each value of i determine the maximum $P_{imax}^{n-1}(f)$ of $P_i^{n-1}(f)$.
3) Compare this value with a predetermined level $P^{max}$, if $P_{imax}^{n-1}(f)$ exceeds this value go to step 1) for the next value of i, if not continue with the next step.
4) Determine for each value of i from step 3) the result $V_i$ of the integral of Eq. 3 or 5 as appropriate.
5) If this value of $V_i$ is the first value store this and return to step 1). If not compare this new value of $V_i$ with the existing value and if the new value is larger by a predetermined small amount discard it. If not store the new $V_i$ and the value of i.
6) Once all m values of potential centre frequencies have been used in steps 1 to 5), determine the value of i having a minimum value of $V_i$ from those which have been stored in step 5).
7) Compare this value with $V_{max}$, if it is lower select the value of i corresponding to this value for determining the centre frequency. If not wait a certain predetermined time and start again at step 1).
8) If no suitable centre frequency has been determined after a predetermined number of tries, consider a handover, or if the transceiver allows it, select a different bandwidth and/or power or a different frequency spectrum.

As an alternative to step 5), the newly calculated value of $V_{max}$ can be compared with a maximum value $V_{max}$. If $V_i$ is less than $V_{max}$, the new value tuple $V_i$, i is stored. To save time, the first value of $V_i$ which is less than $V_{max}$ may be selected for determining the centre frequency of the candidate transmission. As an alternative to step 6) the centre frequency may be selected from the stored value in such a way that it provides the optimum contiguous frequency bands for a subsequent broadband signal, e.g. video.

If the candidate transmission is a not a spread spectrum signal, a FAM in accordance with the present invention may select a suitable centre frequency in accordance with conventional techniques known for etiquette controllers as already mentioned. Alternatively, in accordance with another embodiment of the present invention, the results of Eq. 2 may be used to place a non-spread candidate transmission. As explained above the result of Eq. 2, $P_i^{n-1}(f)$, is the multiplication of the power spectrum of existing transmissions with the candidate transmission signal when this signal has a centre frequency of $f_o+i\times\Delta f$. The maximum value $P_{imax}^{n-1}(f)$ of the function $P_i^{n-1}(f)$, therefore provides a measure of the jamming capability of the existing transmissions with respect to the candidate transmission and of the candidate transmission with respect to the existing transmissions when the centre frequency of the candidate transmission is $f_o+i\times\Delta f$ under the assumption that the existing transmissions are not spread which may be considered as a worst case scenario. Thus, to decide on the frequency allocation of a non-spread candidate transmission, the minimum value of all the maximum values $P_{imax}^{n-1}(f)$ may be selected. If this minimum value is less than a predetermined level $P^{max}$, the transmission may take place as the candidate transmission is unlikely to be interfered with by, or to interfere with the existing transmissions. $P^{max}$ should be chosen so that the requirements of C/I for the transmissions is guaranteed. Instead of determining the minimum in the above way, the $P_{imax}^{n-1}(f)$ of each multiplication $P_i^{n-1}(f)$ may be compared with a maximum allowable value $P^{max}$. If the value of $P_{imax}^{n-1}(f)$ is lower than $P^{max}$ the candidate transmission the tuple $P_{imax}^{n-1}(f)$, i is stored. If the value of $P_{imax}^{n-1}(f)$ is greater $P^{max}$ the value is ignored and the next candidate centre frequency is considered. After all values of i have been used in the calculation, the value of i having the minimum value of $P_{imax}^{n-1}(f)$ is selected to determine the centre frequency of the candidate transmission. If no successful selection can be performed, a certain time may be allowed to elapse and a second attempt made. If selection of a centre frequency is not successful after a certain predetermined number of tries, a change to a different frequency band, a change to a different mode or a handover may be considered. The sequence of steps for allocating a non-spread candidate transmission in accordance with an embodiment of the present invention is:

1) For the candidate non-spread spectrum transmission determine for each value of i the result of multiplication $P_i^{n-1}(f)$ according to Eq. 2.
2) At each value of i determine the maximum $P_{imax}^{n-1}(f)$ of $P_i^{n-1}(f)$.
3) If $P_{imax}^{n-1}(f)$ is the first value store it and i. If not compare the new value $P_{imax}^{n-1}(f)$ with the previous value. If the new value is larger than the previous one by a predetermined small amount, discard the new value and go to step 1) for the next value of i. If not store the new $P_{imax}^{n-1}(f)$ and the value of i.

4) Once all m values of potential centre frequencies have been used in steps 1 to 3), determine the value of i having a minimum value of $P_{imax}^{n-1}(f)$.

5) If this value of $P_{imax}^{n-1}(f)$ is less than a predetermined value $P^{max}$, select this value of i to determine the centre frequency. If not wait a time and start again at step 1).

6) If after several tries no successful allocation can be made, try a handover, or if the transceiver allows it, select a spread spectrum mode or a different frequency band.

As an alternative to step 3), the newly calculated value of $P_{imax}^{n-1}(f)$ can be compared with a maximum value $P^{max}$. If $P_{imax}^{n-1}(f)$ is less than $P_{max}$, the new value tuple $P_{imax}^{n-1}(f)$, i is stored. To speed up the whole procedure, the first value of $P_{imax}^{n-1}(f)$ which is less than $P^{max}$ may be taken as the selected value. As an alternative to step 4) the centre frequency may be selected from the stored values in such a way that it provides the optimum contiguous frequency bands for a subsequent broadband signal, e.g. video.

The present invention also includes duplex transmissions on two different frequencies, i.e. a transmitting frequency and a receiving frequency for each station such as a mobile station or a fixed base station. The FAM of one network element, e.g. a base station may select in accordance with the present invention frequencies for both transmission and reception using one of the above algorithms, alternatively the FAM of the base station may determine the transmit or receive frequency and the FAM of the mobile station may select the receive or transmit frequency, i.e. the two devices wishing to communicate with each other co-operate, each selecting one frequency of the pair. The procedure may be executed as follows: the base station first determines a beacon or marker frequency using one of the algorithms above and transmits on this frequency until the mobile station responds giving its power level and bandwidth for the candidate communication. The base station FAM then determines a receive frequency for the new communication using one of the algorithms above and communicates this frequency to the mobile station on the beacon frequency. The FAM of the mobile station then determines its own receive frequency (transmit frequency of the base station) using one of the above algorithms and communicates this to the base station on the beacon frequency or the base station receive frequency. The advantage of this embodiment is that each device can use its receiver circuits to monitor the frequency spectrum for which it is designed rather than requiring the receivers to receive other frequencies.

In the above embodiments the power spectrum of FIG. 2 was stored in each FAM based on information supplied by other network elements about the current states of associated networks. However, the present invention also includes the power/frequency power spectrum being measured, for example by strategically placed dedicated receivers or by using existing receivers in the network, e.g. reports from mobile and base stations of measured received power levels on performing a frequency scan through the spectrum S. Such measuring devices are known without the specific details of the present invention from, for example, U.S. Pat. Nos. 5,355,522; 5,142,691, WO 96/31075; U.S. Pat. No. 5,625,672.

In the above embodiments of the present invention a considerable amount of signalling may be required to transmit all the information required to determine the power spectra required. In the next embodiment the total amount of signalling is reduced. This embodiment relies on the fact that transmissions from mobile telephones and base stations at some distance from the communicating pair of base and mobile stations may be ignored as the power level of their transmissions is reduced to a low level. Accordingly, each base station of the cellular telephone system in accordance with a further embodiment of the present invention generates a power spectrum of the kind shown in FIG. 2 only taking into account the communications in a certain number of neighbouring cells.

Figure 8:
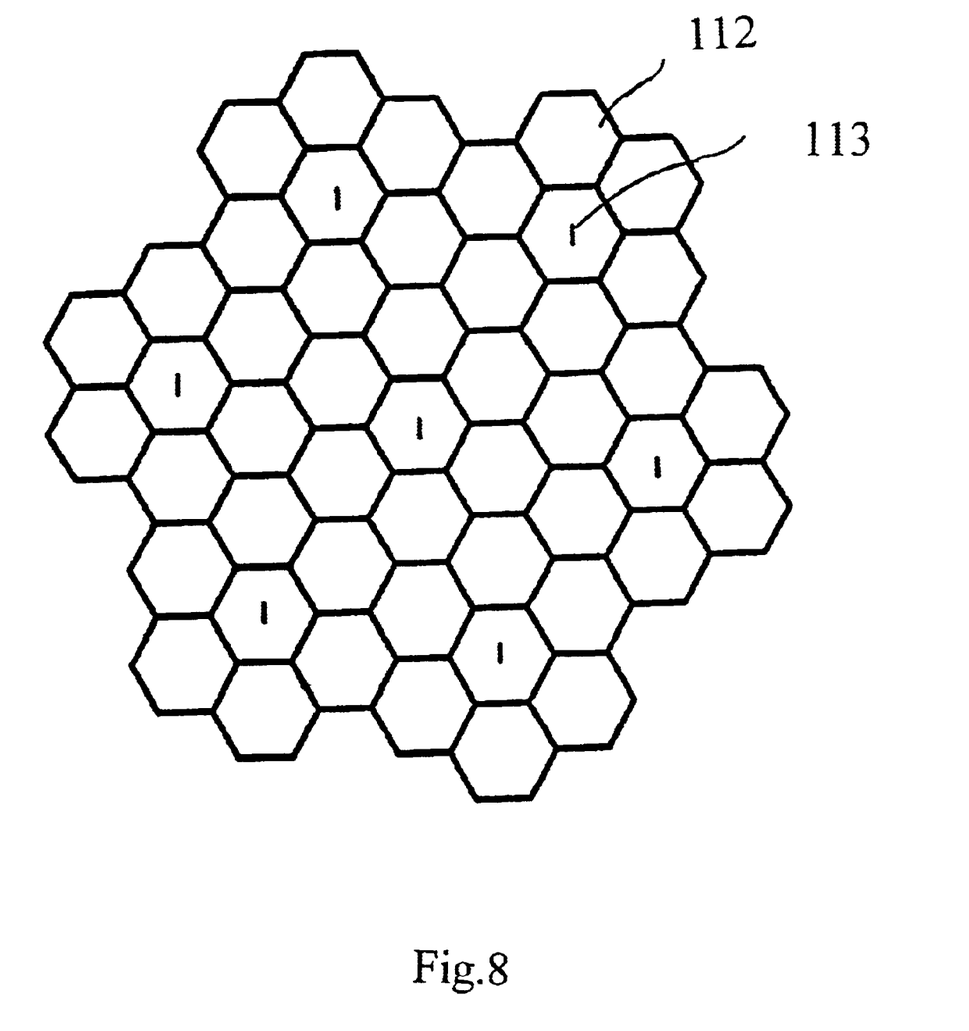
FIG. 8 is a schematic representation of a cellular telephone network to which the present invention may be applied.

As shown schematically in FIG. 8 cells 112 of a cellular mobile telephone system each include a base station 113. The base stations 113 may be any of the transceivers 200, 300, 450 in accordance with the present invention including a FAM as described with reference to FIGS. 5, 6, 7. The cells are shown as hexagonal but it will be appreciated by the skilled person that actual cells may deviate considerably from this form without influencing the present invention. Each base station 113 has a FAM in accordance with the present invention which is responsible for allocating frequencies within its own cell. To carry out such a selection, i.e. to carry out calculations such as equations Eq. 2 and 3 or Eq. 2 and Eq. 5, each FAM receives the power, centre frequency, bandwidth and frame and slot number from each of a certain number of cells around it, communications from mobile and base stations beyond the relevant ring or rings are ignored as they are assumed to be so far away that they cannot interfere nor can they be interfered with by transmissions from the base station in question or the mobile stations in that cell. For example, for creating the power spectrum the base station may use only transmissions from its own cell and ignoring all other cells, or only from its own cell and from the first ring of 6 cells around this cell and ignoring all other cells, or only from its own cell, from the first ring of 6 and from the second ring of 12 making a total of 19 cells and ignoring all other cells. For this purpose each of the base stations 113 may be connected to the 6 or 18 other base stations in the surrounding relevant cells by suitable signalling connections from transmission of the data relevant to existing communications which may include communicating over the radio interfaces between the base stations 113 or by wirelines or by any other suitable means. The power spectrum of the type shown in FIG. 2b is constructed from this received information which specifies existing transmissions in the home cell and the other cells. To calculate this power spectrum, allowance may be made for the reduction in power caused by the distance from the home cell to the cell of the existing transmission on a transmission-by-transmission basis. As an addition, each base station may be provided with monitoring equipment to identify radio sources outside the relevant ring or rings of cells which are so strong that their effect should be included in the creation of the power spectrum of the relevant base station used in the calculations of the allocation decision value V. Further, when there are known strong external transmitters, e.g. microwave point-to-point, this may be added into the power spectrum by programming the FAM accordingly. As an addition or an alternative, each base station may be provided with monitoring equipment to scan the frequency spectrum and construct the power spectrum from this scan. For instance, a scan may be made for a certain time before the transmission has to be placed, e.g. 10 milliseconds and the power spectrum constructed from this data (LBT).

A FAM in accordance with the present invention may be implemented in any suitable way which provides sufficient processing power, e.g. in software on a UNIX™ work station where appropriate or implemented in a base station in a programmable microprocessor or hardwired in an ASIC for mobile stations.

While the invention has been shown and described with reference to preferred embodiments, it will be understood by those skilled in the art that various changes or modifications in form and detail may be made without departing from the scope and spirit of this invention as defined in the attached claims.

What is claimed is:

1. A method of allocating a transmission centre frequency for a candidate transmission within a frequency spectrum available for communications within a telecommunications system, the candidate transmission having a power/frequency characteristic representative of the power of the candidate transmission as a function of frequency, comprising the steps of:

providing a power spectrum representative of the cumulative effect of the power/frequency characteristics of at least a portion of the existing transmissions at a plurality of centre frequencies within the frequency spectrum at the time of allocation;

calculating allocation decision values from a first function of a combination of the power spectrum and the power/frequency characteristic of the candidate transmission, the first function being determined at different frequencies at the time of allocation; and selecting a centre frequency for the candidate transmission from the frequency spectrum based on a minimum value among the calculated allocation decision values or based on a calculated allocation decision value being below a first threshold value.

2. The method according to claim 1, wherein the candidate transmission may have one of at least two bandwidths, the first bandwidth being narrower than the second bandwidth and the first threshold value being lower for a transmission at the first bandwidth compared to the first threshold value for a transmission at the second bandwidth.

3. The method according to claim 1, wherein the selecting step includes selecting a centre frequency only if the value of a second function of the power spectrum and the power/frequency characteristic of the candidate transmission is below a second threshold value.

4. The method according to claim 1, wherein the selection step includes selecting a centre frequency for the candidate transmission which optimises the available frequency spectrum for the next candidate transmission after allocation of the candidate transmission.

5. The method according to claim 4, wherein the selecting step includes leaving the largest contiguous band of frequency spectrum for allocation of the next candidate transmission.

6. The method according to claim 1, the first function of the power spectrum and the power/frequency characteristic of the candidate transmission also depends on the ratio of a bandwidth of the candidate transmission to its bit rate.

7. The method according to claim 1, wherein the telecommunications system is a cellular mobile telephone system and the providing step includes generating the power spectrum based on existing transmissions in a limited number of the cells of the cellular mobile telephone system.

8. A telecommunications system operating within a frequency spectrum available for communications, comprising: means for allocating a centre frequency for a candidate transmission, the candidate transmission having a power/frequency characteristic representative of the power of the candidate transmission as a function of frequency; means for providing a power spectrum representative of the cumulative effect of the power/frequency characteristics of at least a portion of the existing transmissions at a plurality of centre frequencies at the time of allocation; and the allocating means including: means for calculating allocation decision values from a first function of a combination of the power spectrum and the power/frequency characteristic of the candidate transmission, the first function being determined at different frequencies at the time of allocation; and means for selecting a centre frequency for the candidate transmission from the frequency spectrum based on a minimum value among the calculated allocation decision values or based on a calculated allocation decision value being below a first threshold value.

9. The telecommunications system according to claim 8, wherein the evaluating means is adapted to determine the first function of the power spectrum and the power/frequency characteristic of the candidate transmission in accordance with the ratio of a bandwidth of the candidate transmission to its bit rate.

10. The telecommunications system according to claim 8, wherein the selecting means is adapted to select a centre frequency only if the value of a second function of the power spectrum and the power/frequency characteristic of the candidate transmission is below a second threshold value.

11. The telecommunications system according to claim 8, wherein the system is a cellular mobile telephone system and the providing means determines the power spectrum based on existing transmissions in a limited number of cells of the cellular mobile telephone system.

12. A frequency allocating device for use in a telecommunications system operating within a frequency spectrum, the frequency allocating device comprising: means for allocating a centre frequency for a candidate transmission, the candidate transmission having a power/frequency characteristic representative of the power of the candidate transmission as a function of frequency; means for providing a power spectrum representative of the cumulative effect of the power/frequency characteristics of at least a portion of the existing transmissions within the frequency spectrum at a plurality of centre frequencies at the time of allocation; and the allocating means including: means for calculating allocation decision values from a first function of a combination of the power spectrum and the power/frequency characteristic of the candidate transmission, the first function being determined at different frequencies at the time of allocation; and means for selecting a centre frequency for the candidate transmission from the frequency spectrum based on a minimum value among the calculated allocation decision values or based on a calculated allocation decision value being below a first threshold value.

13. The frequency allocating device according to claim 12, wherein the evaluating means is adapted to determine the first function of the power spectrum and the power/frequency characteristic of the candidate transmission in dependence on the ratio of the bandwidth to the bit rate of the candidate transmission.

14. The frequency allocating device according to claim 12, wherein the selecting means is adapted to select a centre frequency only if the value of a second function of the power spectrum and the power/frequency characteristic of the candidate transmission is below a second threshold value.

15. A method of operating a frequency allocation device for allocating a transmission centre frequency for a candidate transmission within a given frequency spectrum available for communications within a telecommunications system, the candidate transmission having a power/frequency characteristic which is a representation; of the power of the candidate transmission as a function of frequency; comprising the steps of: providing a power spectrum comprising a representation of the cumulative effect of the power/frequency characteristics of at least a portion of the existing transmissions at a plurality of centre frequencies within the frequency spectrum calculating allocation decision values from a first fraction of a combination of the power spectrum and the power/frequency characteristic of the candidate transmission the first function being determined at different frequencies at the time of allocation; and selecting a centre frequency for the candidate transmission from the frequency spectrum based on a minimum value among the calculated allocation decision values or based on a calculated allocation decision value being below a first threshold value.

16. The method according to claim 15, wherein the candidate transmission may have one of at least two bandwidths, the first bandwidth being narrower than the second bandwidth and the first threshold value being lower for a transmission at the first bandwidth compared to the first threshold value for a transmission at the second bandwidth.

17. The method according to claim 15, wherein the selecting step includes selecting a centre frequency only if the value of a second function of the power spectrum and the power/frequency characteristic of the candidate transmission is below a second threshold value.

18. The method according to claim 15, wherein the selection step includes selecting a centre frequency for the candidate transmission which optimises the available frequency spectrum for the next candidate transmission after allocation of the candidate transmission.

19. The method according to claim 18, wherein the selecting step includes leaving the largest contiguous band of frequency spectrum for allocation of the next candidate transmission.

20. The method according to claim 15, wherein the evaluating step includes determining the first function of the power spectrum and the power/frequency characteristic of the candidate transmission in dependence on the ratio of a bandwidth of the candidate transmission to its bit rate.

21. A method according to claim 1, wherein the calculation of allocation decision values is carried out on a communication-by-communication basis.

22. A telecommunications system according to claim 8, wherein said means for calculating allocation decision values calculates the decision values an a communication-by-communication basis.

23. A frequency allocating device according to claim 12 wherein said means for calculating allocation decision values calculates the decision values on a communication-by-communication basis.

24. A method according to claim 15, wherein the calculation of allocation decision values is carried out on a communication-by-communication basis.

* * * * *